(12) United States Patent
Yang

(10) Patent No.: US 10,779,325 B2
(45) Date of Patent: Sep. 15, 2020

(54) METHODS AND APPARATUS FOR CHANNEL ACCESS IN MOBILE COMMUNICATIONS

(71) Applicant: MediaTek Inc., Hsinchu (TW)

(72) Inventor: Weidong Yang, San Diego, CA (US)

(73) Assignee: MEDIATEK INC., Hsin-Chu (TW)

( * ) Notice: Subject to any disclaimer, the term of this patent is extended or adjusted under 35 U.S.C. 154(b) by 126 days.

(21) Appl. No.: 16/054,198

(22) Filed: Aug. 3, 2018

(65) Prior Publication Data

US 2019/0045542 A1    Feb. 7, 2019

Related U.S. Application Data

(60) Provisional application No. 62/540,631, filed on Aug. 3, 2017.

(51) Int. Cl.
| | | |
|---|---|---|
| *H04W 4/00* | (2018.01) | |
| *H04W 74/08* | (2009.01) | |
| *H04B 7/06* | (2006.01) | |
| *H04B 17/318* | (2015.01) | |
| *H04W 52/50* | (2009.01) | |
| *H04B 7/0456* | (2017.01) | |
| *H04W 52/24* | (2009.01) | |
| *H04L 5/00* | (2006.01) | |

(52) U.S. Cl.
CPC ...... *H04W 74/0808* (2013.01); *H04B 7/0456* (2013.01); *H04B 7/0617* (2013.01); *H04B 7/0626* (2013.01); *H04B 17/318* (2015.01); *H04W 52/245* (2013.01); *H04W 52/50* (2013.01); *H04W 74/0816* (2013.01); *H04L 5/005* (2013.01); *H04L 5/0035* (2013.01); *H04L 5/0048* (2013.01)

(58) Field of Classification Search
None
See application file for complete search history.

(56) References Cited

U.S. PATENT DOCUMENTS

| 7,983,230 B1 | 7/2011 | Li et al. |
| 2004/0102198 A1 | 5/2004 | Diener et al. |
| 2007/0133499 A1 | 6/2007 | Wang |
| 2010/0002659 A1* | 1/2010 | Doi ................... H04W 52/0229 370/338 |

(Continued)

FOREIGN PATENT DOCUMENTS

CN    106301676 A    1/2017

OTHER PUBLICATIONS

State Intellectual Property Office, International Search Report and Written Opinion for International Patent Application No. PCT/CN2018/098566, dated Oct. 26, 2018.

(Continued)

*Primary Examiner* — Phirin Sam
(74) *Attorney, Agent, or Firm* — Han IP PLLC; Andy M. Han

(57) ABSTRACT

Various examples and schemes pertaining to channel access in mobile communications are described. A processor of a second apparatus receives a probing signal from a first apparatus. The processor performs measurement of the probing signal. The processor generates a power-controlled clear-to-send (CTS) signal with respect to the measurement. The processor then transmits the power-controlled CTS signal to the first apparatus.

18 Claims, 6 Drawing Sheets

(56) References Cited

U.S. PATENT DOCUMENTS

| | | | |
|---|---|---|---|
| 2010/0316043 A1* | 12/2010 | Doi | H04L 27/0006 |
| | | | 370/350 |
| 2011/0085532 A1* | 4/2011 | Scherzer | H04W 28/18 |
| | | | 370/338 |
| 2011/0305236 A1 | 12/2011 | Morioka | |
| 2015/0103789 A1 | 4/2015 | Tanaka | |
| 2015/0319700 A1* | 11/2015 | Oteri | H04W 52/28 |
| | | | 455/127.1 |
| 2015/0372794 A1 | 12/2015 | Kim et al. | |
| 2017/0367000 A1* | 12/2017 | Pragada | H04W 16/14 |
| 2020/0015124 A1* | 1/2020 | Turtinen | H04W 28/18 |

OTHER PUBLICATIONS

Taiwan Intellectual Property Office, Office Action for Taiwan Patent Application No. 107127099, dated Jul. 29, 2019.

* cited by examiner

METHODS AND APPARATUS FOR CHANNEL ACCESS IN MOBILE COMMUNICATIONS

CROSS REFERENCE TO RELATED PATENT APPLICATION(S)

The present disclosure is part of a non-provisional application claiming the priority benefit of U.S. Patent Application No. 62/540,631, filed on 3 Aug. 2017, the content of which is incorporated by reference in its entirety.

TECHNICAL FIELD

The present disclosure is generally related to mobile communications and, more particularly, to channel access in mobile communications.

BACKGROUND

Unless otherwise indicated herein, approaches described in this section are not prior art to the claims listed below and are not admitted as prior art by inclusion in this section.

Interference handling is a common theme for a number of problems in wireless communications such as multi-user multiple-input-and-multiple-output (MU-MIMO) interference, intercell interference, dynamic time-division duplexing (TDD) for licensed spectrum access and unlicensed spectrum access, device-to-device (D2D) communications, and unlicensed spectrum access. For MU-MIMO/intercell interference, interference handling is possible through coordinated transmission at network, either by intra-cell coordination or inter-cell coordination. For inter-cell coordination, an ideal backhaul is typically assumed. When only non-ideal backhaul is available between cells, technologies as developed in Enhanced Coordinated Multi-Point (eCoMP) can still be considered, and channel state information and scheduling information need to be acquired and exchanged through backhaul. For dynamic TDD (e.g., over licensed spectrum or shared spectrum), coordination over backhaul may not be feasible due to, for example, absence of ideal backhauls given high implementation costs and/or cells belonging to different operators. In conventional communication systems, typically a central controller exists for radio resource management for nodes under one cell. In some D2D cases, all nodes are on equal footing and there is no central controller. For unlicensed access, coordination through backhaul may not be feasible as nodes in the proximity of one another may belong to different owners (e.g., operators or users) and/or utilize different access technologies.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In view of the above, it can be seen that there may be benefits associated with distributed, over-the-air coordination among cells and nodes (where a node may be a user equipment (UE) or a base station). Accordingly, the present disclosure proposes a unified solution for MU-MIMO, inter-cell interference management, dynamic TDD, D2D and unlicensed spectrum access.

In one aspect, a method may involve a processor of a second apparatus receiving a probing signal from a first apparatus. The method may also involve the processor performing measurement of the probing signal. The method may further involve the processor generating a power-controlled clear-to-send (CTS) signal with respect to the measurement. The method may additionally involve the processor transmitting the power-controlled CTS signal to the first apparatus.

In one aspect, a method may involve a processor of a third apparatus receiving a power-controlled clear-to-send (CTS) signal from a second apparatus which is in wireless communication with a first apparatus. The method may also involve the processor comparing a signal strength of the power-controlled CTS signal to a threshold. The method may further involve the processor adjusting a transmission power and/or choosing a modulation coding scheme (MCS) level of the transmission based on a result of the comparing.

In one aspect, a method may involve a processor of a second apparatus receiving, during a first time slot, a first power-controlled CTS signal associated with a first communication link from a first apparatus. The method may also involve the processor transmitting, during a second time slot, a second power-controlled CTS associated with a second communication link. The method may further involve the processor determining, based on the first power-controlled CTS, whether a transmission by the second apparatus over the second communication link will cause interference on the first communication link with a level of the interference over a limit. The method may additionally involve the processor adjusting a transmission power based on a result of the determining.

In one aspect, a method may involve a processor of a second apparatus establishing a wireless communication with a first apparatus in a wireless network. The method may also involve the processor testing each of a downlink and an uplink of the wireless communication between the first apparatus and the second apparatus for compatibility with one or more other communication links between two or more other wireless communication devices in the wireless network. The method may further involve the processor adjusting a transmission power based on a result of the testing.

It is noteworthy that, although description provided herein may be in the context of certain radio access technologies, networks and network topologies such as LTE, LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
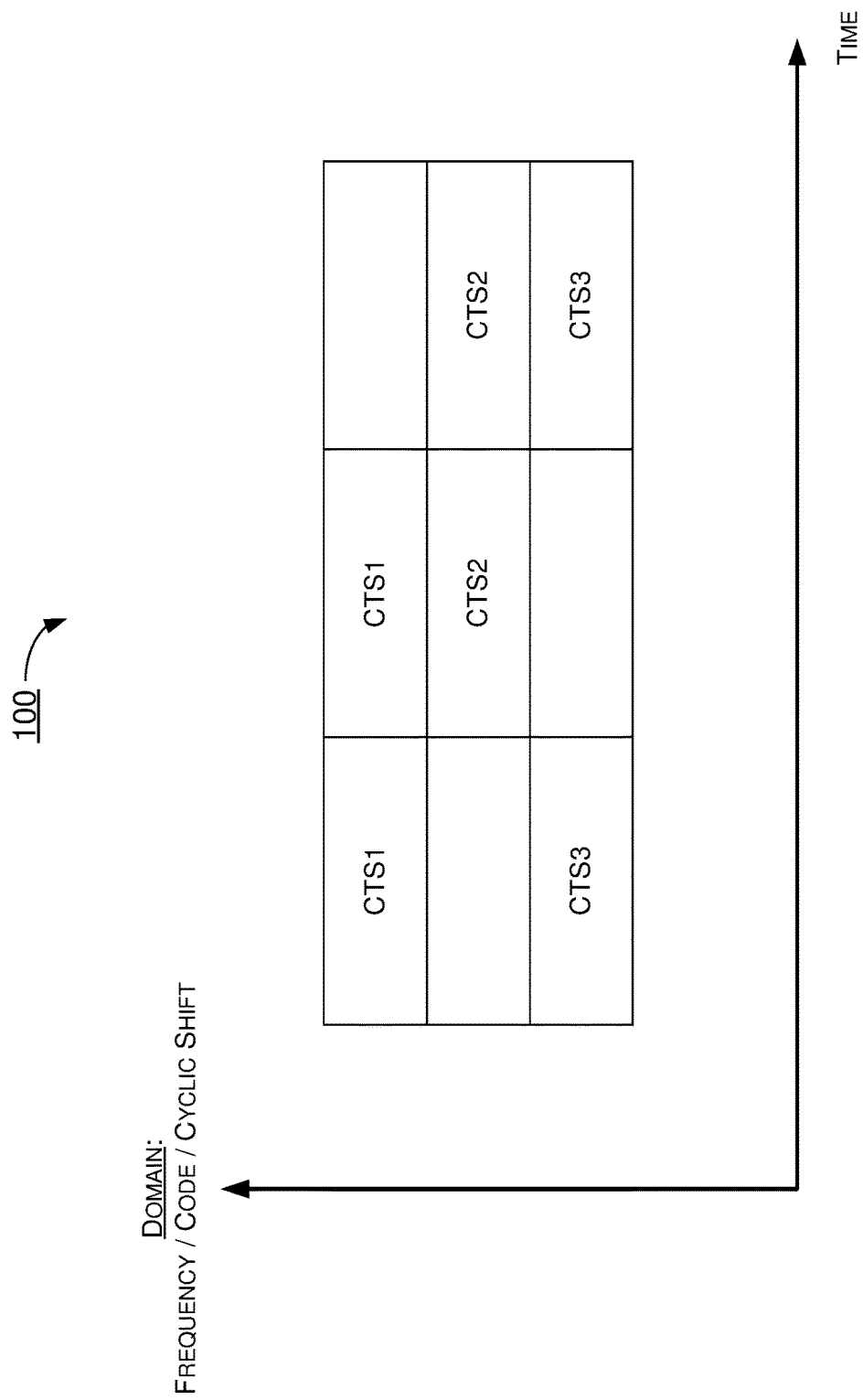
FIG. 1 is a diagram of an example scenario of compatibility testing for different links in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to sounding reference signal design with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

There are interference management schemes under each area (e.g., MU-MIMO, dynamic TDD and the like), which may potentially be applicable to other areas. The present disclosure focuses on interference management schemes originated from D2D for the reason that coordination complexity for such schemes may scale more gracefully than schemes originated from other areas, since coordination complexity is a fundamental problem that the interference management scheme for a D2D system needs to face.

Compatible Link Identification Through Inverse Power Control

At a high level, it is desirable to identify compatible links in a considered space. The considered space may include immediately adjacent areas around a base station, an expansive area in a wireless network, or an area with a number of devices. To illustrate the idea of inverse power control, it may be assumed that there are four nodes in a system, namely node 1, node 2, node 3 and node 4. In this example, node 1 and node 2 are engaged in unidirectional data transmission from node 1 to node 2. The data link from node 1 to node 2 is considered an existing link or prioritized link. Additionally, in this example, node 3 intends to transmit data to node 4. As the transmission from node 3 to node 4 can create interference on node 2, node 3 needs to test whether the intended transmission would pose excessive interference on node 2. In other words, a mechanism is required to test whether additional link(s) can be introduced without causing detrimental effects on the existing/prioritized link.

As node 1 transmits data to node 2, the coupling loss between node 1 and node 2 may be denoted by $h_{1,2}$ in the linear scale. In the middle of the data transmission from node 1 to node 2 (e.g., in the transmission gap of the data transmission from node 1 to node 2), or before data transmission from node 1, node 2 may transmit a signal with the signal strength being proportional to $1/h_{1,2}$. Borrowing a terminology of WiFi, such a signal may be referred to as a power-controlled clear-to-send (CTS) signal herein. If power control is used at any transmitter, then difference in transmission power needs to be accounted for. The intention is that the area cleared by power-controlled CTS is determined in part by the receive signal strength of the desired signal. To that end, the power-controlled CTS signal strength is proportional to $1/(h_{1,2}P_1)$, where $P_1$ is the transmit power at node 1.

Assuming the coupling loss between node 3 and node 2 is $h_{3,2}$, and further assuming that the coupling loss between node 2 and node 3 is the same as $h_{3,2}$. the receive signal strength from the power-controlled CTS of node 2 at node 3 is proportional to $h_{3,2}/(h_{1,2}P_1)$, which is compared to a threshold to determine at what power level the transmission power of node 3 would not generate or otherwise create too much interference on node 2.

Inverse Power Control Considering Beamforming

Under a proposed scheme in accordance with the present disclosure, inverse power control may be extended to the case with beamforming. Here, the notation of Tx(a,b) is used to denote the transmit (Tx) beam controlled by node a with node b as the intended recipient. It is noteworthy that Tx(a,b) is determined with both the effects of Tx beamforming at node a and receive (Rx) beamforming at node b. Moreover, the notation of Rx(a,b) is used to denote the Rx beam controlled by node a with node b as the intended sender. It is noteworthy that Rx(a,b) is determined the effects of Rx beamforming at node a and Tx beamforming at node b. Tx(a,b)/Rx(a,b) can be identified from beam management procedure and/or channel state information (CSI) acquisition procedure as developed in New Radio (NR)/5G if the involved nodes are a UE and a base station. It is also noteworthy that the effects of both digital beamforming and analog beamforming are included in Tx(a,b) and Rx(a,b). Under the proposed scheme, it may be assumed that beam reciprocity holds between Tx beam and Rx beam between two nodes; and for description below that the number of Tx antennas equals to the number of Rx antennas at a given node. Moreover, Tx(a,b)=Rx(a,b) for any pair of node a and node b.

As an illustrative example, node 1 transmits data to node 2, with the channel response between node 1 and node 2 being $H_{1,2}$, and the channel response between node 3 and node 2 being $H_{3,2}$. Node 1 uses the Tx beam at Tx(1,2), assuming $W_{1,2}$, which is the beamforming weight (including both analog beamforming and digital beamforming to generate a Tx beam from node 1 to node 2), is used at Tx, and node 2 uses Rx beam at Rx(2,1), assuming $W_{2,1}$ is used at receive including both analog beamforming and digital beamforming, and $W_{3,4}$ is the Tx weight at node 3 with node 4 as the intended recipient.

When node 1 transmits to node 2 at the same time as node 3 transmits to node 4, the receiver model at node 2 may be denoted by Expression (1) below.

$$r_1 = W_{2,1}^T(H_{1,2}W_{1,2}x_1 + H_{3,2}W_{3,4}x_3 + n), \quad (1)$$

Here, n denotes thermal noise, and $(\ )^T$ denotes the transpose operator, $x_1$ is the signal/data transmitted from node 1 to node 2, $x_3$ is the signal/data from node 3 to node 4. The signal-to-interference ratio (SIR) at node 2 may be denoted by Expression (2) below.

$$\frac{|W_{2,1}^T H_{1,2} W_{1,2}|^2 \sigma_1^2}{|W_{2,1}^T H_{3,2} W_{3,4}|^2 \sigma_3^2}, \quad (2)$$

Here, $\sigma_1^2$ denotes the average signal power for $x_1$ and $\sigma_3^2$ is the average signal power for $x_3$.

It is noteworthy that, when both node 1 and node 3 conduct rank 1 transmission, the SIR expression is precise under the condition that node 2 uses the optimal Rx weight $W_{2,1}$ for interference-free transmission also as the Rx weight when interference is present. Hence, the actual SIR may be better than that from Expression (2) if node 2 chooses the optimal Rx weight (including both the effects of analog beamforming and digital beamforming) according to the present interference.

In the case that either node 1 or node 3 conducts transmission at more than rank 1, one adaption for such case is that Frobenius norm for matrices is utilized in Expression (2).

In the middle of the data transmission from node 1 to node 2 (e.g., in the transmission gap of the data transmission) or before data transmission from node 1, node 2 transmits a signal with the signal strength being proportional to $1/(|W_{2,1}^T H_{1,2} W_{1,2}|\sigma_1)$ with Tx beam Tx(2,1) (equal to Rx(2,1) by the reciprocity assumption). It is noteworthy that there may be a pattern in the time domain such as downlink-uplink-downlink-uplink (DUDU), where node 1 transmits to node 2 during "D", node 2 transmits to node 1 during "U" (over partial or entire duration of "U"), with "U" being considered as a "transmission gap" herein. Borrowing a terminology of WiFi, such a signal can be named power-controlled CTS. With Tx beam Tx(2,1) for node 2 and Rx beam Rx(3,4) for node 3 (equal to Tx(3,4) from the reciprocity assumption), the receiver model at node 3 for the power-controlled CTS may be denoted by Expression (3) below.

$$r_3 = W_{3,4}^T(H_{3,2}^T W_{2,1} f x_2 + n'), \quad (3)$$

Here, f denotes a power scaling factor and $f = d/(|W_{2,1}^T H_{1,2} W_{1,2}|\sigma_1)$, and d controls the signal strength of the receive signal. The signal strength may be denoted by Expression (4) below.

$$\frac{d^2|W_{3,4}^T H_{3,2}^T W_{2,1}|^2 \sigma_2^2}{|W_{2,1}^T H_{1,2} W_{1,2}|^2 \sigma_1^2} \quad (4)$$

Here, $\sigma_2^2$ denotes the average signal power for $x_2$, which denotes data/signal transmitted from node 2 to node 1. It is noteworthy that $\sigma_2^2$ needs to be known at node 3 in order for node 3 to deduce the SIR correctly, hence a fixed value may be assumed for $\sigma_2^2$. The signal strength of the receive signal may be compared to a threshold to determine at what power level the transmission by node 3 would not generate too much interference on node 2.

It may be seen that, as node 4 uses Rx(3,4) to check the receive signal strength, the proposed scheme may function properly as long as the power-controlled CTS's from different nodes do not overlap. Otherwise, node 3 may take an overly pessimistic Tx power in its transmission to node 4. Node 1 can send a probing signal with the beamforming weight $w_{1,2}$ to node 2, and node 2 can measure the transmitted test signal and derive "f" subsequently. The test signal can be sent in the transmission gap mentioned above. However, it can be seen that the transmission of the probing signal would consume radio resources and generate interference to other nodes. Hence, it is disclosed below that a proposed scheme in accordance with the present disclosure utilizes signal transmission for other purposes to achieve the same functionalities as the probing signal. When a first node (e.g., node 1) is a base station and a second node (e.g., node 2) is a UE, typically the base station needs to send some signals to the UE anyway, for example for CSI acquisition and/or beam management, and/or cell acquisition (synchronization signal block), hence a signal introduced in the NR air interface for any of such purposes is used to realize the probing signal or emulate the (probing signal. For node 2 to transmit the power-controlled CTS, f as defined above may include the term $H_{1,2}W_{1,2}$. In the following, various cases where $H_{1,2}W_{1,2}$, which is associated with the probing signal, is obtained at node 2 are described.

Depending on whether beamformed channel state information reference signal (CSI-RS) is used, there may be two approaches. In a modern communication system such as LTE or NR, typically the base station first sends a reference signal to a user equipment (UE) for the UE to take measurement. The UE then reports CSI to the base station, and the base station transmits data to the UE. Under a first approach, with node 1 being a base station and node 2 being a UE, node 1 may use $W_{1,2}$ for the beamformed CSI-RS and node 2 may measure the beamformed CSI-RS from node 1. In this illustrative example, it may be assumed that the network makes scheduling decision according to the CSI feedback from node 2 without change. That is, the rank indicator (RI), CSI-RS resource selection and precoding matrix indicator (PMI) used by node 1 in data transmission to node 2 may be exactly the same as in the feedback from node 2. In this case, node 1 needs not send a pre-scheduling reference signal for node 2 to take measurement, and the functionality of pre-scheduling reference signal is already provided by the beamformed CSI-RS signal.

Alternatively, node 1 may transmit a non-precoded CSI-RS and node 2 may obtain an estimate of $H_{1,2}$. Next, node 2 may assume that node 1 will use the recommended RI and PMI $((W_{1,2}))$ from itself without change in the data transmission for node 2, then a probing signal may be emulated through $\hat{H}_{1,2}W_{1,2}$. It is noteworthy that, for the emulated probing signal to work, it is necessary to assume that all the beamforming processing from node 1 is captured in $W_{1,2}$. If this is not valid, then analog beamforming may need to be included in the CSI-RS transmission, instead of non-precoded CSI-RS, and it may also be necessary to assume that CSI-RS with analog beamforming without digital beamforming is transmitted by node 1 so that node 2 can obtain an estimate $H_{1,2}W_{1,2,analog}$. Emulation at node 2 may be just for $W_{1,2,digital}$.

Under a second approach, the node 1 may be allowed to depart from the CSI feedback from node 2 in its scheduling decision. In this case, $H_{1,2}W_{1,2}$ may be made known at node 2 through the transmission of some pre-scheduling reference signal transmission to provide node 2 with the probing signal (note: in this case probing signal may be the pre-scheduling reference signal). Borrowing a terminology of WiFi, such transmission may be referred to as the precoded RTS transmission. In this case, the choice of $W_{1,2}$ is transparent to node 2. That is, node 2 may estimate the composite channel response $H_{1,2}W_{1,2}$ without knowing the individual contribution from $H_{1,2}$ and $W_{1,2}$. It is noteworthy that, as there is no dependence on CSI-RS for CSI acquisition in this case, the Tx/Rx procedure at node 2 tends to be simple.

In summary, the probing signal is achieved through CSI-RS transmission or transmission of a pre-scheduling reference signal from node 1, node 2 may obtain an estimate $H_{1,2}W_{1,2}$, where $W_{1,2}$ captures the Tx processing due to digital beamforming, analog beamforming, or both.

It is noteworthy that node 2 may transmit precoded CTS as discussed previously. The selection of d and possible ways to trade off between Tx power and estimation accuracy at node 3 may be taken into consideration. For instance, iterations over Tx/Rx weights may substantially increase system throughputs compared with non-iteration transmissions. Moreover, node 3 may assess potential interference which it may generate when it transmits to node 4. The assessment metric may be optimized also, especially depending on the possible difference between the transmission rank of node 1 and that of node 3.

Furthermore, there may be a number of options for the behavior of node 3 after interference assessment. In a first option, node 3 may always transmit to node 4 subject to the transmission power cap enforced by inverse power control, and node 3 may keep the same modulation coding scheme (MCS) level for the transmission irrespective of the Tx power level. In other words, node 4 may not expect the MCS level of transmission from node 3 to change. In a second option, depending on the resulted maximum Tx power level, node 3 may decide to abandon the Tx opportunity for the current time unit (e.g., a slot/subframe or a number of subframes) or to adjust the MCS level with respect to a prior signaling (e.g., physical downlink control channel (PD-CCH)) to node 4 even though node 3 may decide that it still can transmit to node 4.

Prioritized Transmission Versus Free-for-All

In an event that prioritized transmissions and non-prioritized transmissions are defined, all the recipient nodes in prioritized links may transmit power-controlled CTS's, and the sender nodes in non-prioritized links may test the power-controlled CTS's. In a free-for-all scheme under the present disclosure, all links may compete for access. In this case, the sender nodes in all links may need to test the power-controlled CTS's from recipient nodes in all links. The mutual hear-ability may be handled with Tx patterns. In some cases, the Tx patterns from D2D design such as, for example, the Scheduling Assignment (SA) Tx pattern design or Type 2B discovery message Tx pattern design may be considered in 3GPP device-to-device communication design. In some cases, randomized Tx patterns may also be considered. The power control of CTS may also be used to create different priority levels. Under a proposed scheme in accordance with the present disclosure, randomized priority levels from nodes over different transmission bursts may be used, so that prioritized/un-equal priority transmission at a local time span may allow spectrum reuse and that fairness in the long term may be guaranteed.

FIG. 1 illustrates an example scenario 100 of compatibility testing for different links in accordance with an implementation of the present disclosure. In the example shown in FIG. 1, three links are tested for compatibility, and the transmissions of three power-controlled CTS's are shown. Referring to FIG. 1, CTS1 (associated with link 1) is transmitted in times 1 and 2, CTS2 (associated with link 2) is transmitted in times 2 and 3, and CTS3 (associated with link 3) is transmitted in times 1 and 3. At time 1, the sender in link 2 tests whether its potential transmission would cause too much interference on links 1 and 3. At time 2, the sender in link 3 tests whether its potential transmission would cause too much interference on links 1 and 2. At time 3, the sender in link 1 tests whether its potential transmission would cause too much interference on links 2 and 3.

It may happen that, in a free-for-all scheme, the power-controlled CTS from link 1 or 3 blocks the potential transmission for link 2, at the same time the power-controlled CTS from links 1 or 2 blocks the potential transmission for link 3, and at the same time the power-controlled CTS from link 2 or 3 blocks the potential transmission for link 1. The sender in each link may decide not to transmit so as to defer to other links, and in the end no link may use the channel. This situation may be referred to as a "deadlock situation" herein. As a remedy, the sender in link 1 may be allowed to adopt a higher Tx power temporarily so that link 1 may be temporarily favored (e.g., better protected) than links 2 and 3, and the deadlock situation may be avoided.

Network Architecture Conversion from Cellular to D2D

The above proposed schemes provide a solution for D2D/unlicensed communications. One issue to be addressed is how to reformulate other interference management scenarios into D2D/unlicensed communications. That is, with a solution for interference management for D2D links or efficient spatial packing with D2D links, other problems of interest may be formulated into D2D link packing problems.

One assumption is that there is an effective method to identify compatible links in a considered space. It is noteworthy that the links between a base station and a UE may be represented by two unidirectional links, namely a downlink and an uplink. In cell k, there are a number of UEs, $U_{k,1}$, $U_{k,2}$, . . . , $U_{k,M_k}$, and $M_k$ denotes the number of UEs under cell k. The communication between the base station and UE $U_{k,m}$ may be represented by a bidirectional link, which may include both a downlink and an uplink. The bidirectional link may be split into two unidirectional links: $L(k,U_{k,m})$ (for a downlink originating from base station k to UE $U_{k,m}$) and $L(U_{k,m},k)$ (for an uplink originating from UE $U_{k,m}$ to base station k).

After the split of all bidirectional links into unidirectional links, a set of unidirectional links may be obtained and denoted by Expression (5) below.

$$\{L(k,U_{k,m}),L(U_{k,m},k)|1\leq k\leq C,1\leq k\leq M_k\}, \tag{5}$$

Here, C denotes the number of cells in the considered space and $M_k$ denotes the number of UEs under cell k.

As an illustrative example, let M=2, and $M_1=M_2=3$. For MU-MIMO, for example for cell 1, $L(1,U_{1,1})$ and $L(1,U_{1,2})$ may be tested for compatibility. In this case, one way may be to use beamformed sounding reference signal (SRS) transmissions for power-controlled CTS. For dynamic TDD, compatibility among links from different cells may be tested, and some links may be for downlink and some for uplink. When MU-MIMO, dynamic TDD, D2D co-exist in an area, the power-controlled CTS's for various nodes can share the same resource pool which may include multiple occasions of power-controlled CTS's, and Tx and Rx patterns such as those used in LTE D2D SA/Type 2B discovery can be used.

Illustrative Implementations

Figure 2:
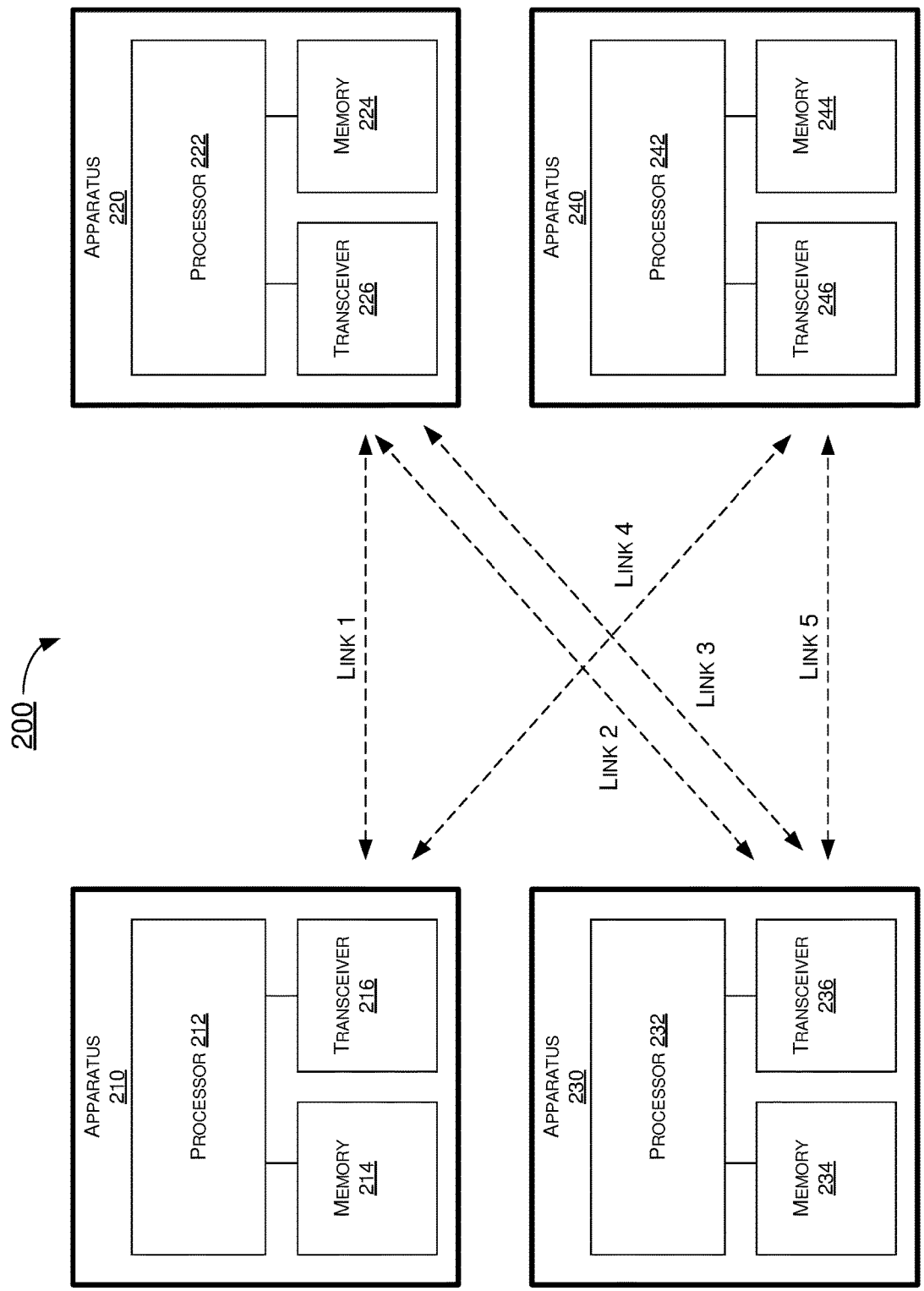
FIG. 2 is a block diagram of an example communication environment in accordance with an implementation of the present disclosure.

FIG. 2 illustrates an example communication environment 200 having an example apparatus 210, an example apparatus 220, an example apparatus 230 and an example apparatus 240 in accordance with an implementation of the present disclosure. Each of apparatus 210, apparatus 220, apparatus 230 and apparatus 240 may perform various functions to implement schemes, techniques, processes and methods described herein pertaining to channel access in mobile communications, including various schemes described above as well as processes 300, 400, 500 and 600 described below.

Each of apparatus 210, apparatus 220, apparatus 230 and apparatus 240 may be a part of an electronic apparatus, which may be a user equipment (UE) such as a portable or mobile apparatus, a wearable apparatus, a wireless communication apparatus or a computing apparatus. For instance, each of apparatus 210, apparatus 220, apparatus 230 and apparatus 240 may be implemented in a smartphone, a smartwatch, a personal digital assistant, a digital camera, or a computing equipment such as a tablet computer, a laptop computer or a notebook computer. Each of apparatus 210, apparatus 220, apparatus 230 and apparatus 240 may also be a part of a machine type apparatus, which may be an IoT or NB-IoT apparatus such as an immobile or a stationary apparatus, a home apparatus, a wire communication apparatus or a computing apparatus. For instance, each of apparatus 210, apparatus 220, apparatus 230 and apparatus 240 may be implemented in a smart thermostat, a smart fridge, a smart door lock, a wireless speaker or a home control center. Alternatively, each of apparatus 210, apparatus 220, apparatus 230 and apparatus 240 may be implemented in the form of one or more integrated-circuit (IC) chips such as, for example and without limitation, one or more single-core processors, one or more multi-core processors, or one or more complex-instruction-set-computing (CISC) processors. Each of apparatus 210, apparatus 220, apparatus 230 and apparatus 240 may include at least some of those components shown in FIG. 2 such as a processor 212, a processor 222, a processor 232 and a processor 242, respectively. Each of apparatus 210, apparatus 220, apparatus 230 and apparatus 240 may further include one or more other components not pertinent to the proposed scheme of the present disclosure (e.g., internal power supply, display device and/or user interface device), and, thus, such component(s) of each of apparatus 210, apparatus 220, apparatus 230 and apparatus 240 are neither shown in FIG. 2 nor described below in the interest of simplicity and brevity.

In some implementations, at least one of apparatus 210, apparatus 220, apparatus 230 and apparatus 240 may be a part of an electronic apparatus, which may be a network node such as a transmit/receive point (TRP), a base station, a small cell, a router or a gateway. For instance, at least one of apparatus 210, apparatus 220, apparatus 230 and apparatus 240 may be implemented in an eNodeB in an LTE, LTE-Advanced or LTE-Advanced Pro network or in a gNB in a 5G, NR, IoT or NB-IoT network. Alternatively, at least one of apparatus 210, apparatus 220, apparatus 230 and apparatus 240 may be implemented in the form of one or more IC chips such as, for example and without limitation, one or more single-core processors, one or more multi-core processors, or one or more CISC processors.

In one aspect, each of processor 212, processor 222, processor 232 and processor 242 may be implemented in the form of one or more single-core processors, one or more multi-core processors, or one or more CISC processors. That is, even though a singular term "a processor" is used herein to refer to processor 212, processor 222, processor 232 and processor 242, each of processor 212, processor 222, processor 232 and processor 242 may include multiple processors in some implementations and a single processor in other implementations in accordance with the present disclosure.

In another aspect, each of processor 212, processor 222, processor 232 and processor 242 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212, processor 222, processor 232 and processor 242 is a special-purpose machine specifically designed, arranged and configured to perform specific tasks including channel access in mobile communications in accordance with various implementations of the present disclosure.

In some implementations, apparatus 210 may also include a transceiver 216 coupled to processor 212 and capable of wirelessly transmitting and receiving data. In some implementations, apparatus 210 may further include a memory 214 coupled to processor 212 and capable of being accessed by processor 212 and storing data therein. In some implementations, apparatus 220 may also include a transceiver 226 coupled to processor 222 and capable of wirelessly transmitting and receiving data. In some implementations, apparatus 220 may further include a memory 224 coupled to processor 222 and capable of being accessed by processor 222 and storing data therein. In some implementations, apparatus 230 may also include a transceiver 236 coupled to processor 232 and capable of wirelessly transmitting and receiving data. In some implementations, apparatus 230 may further include a memory 234 coupled to processor 232 and capable of being accessed by processor 232 and storing data therein. In some implementations, apparatus 240 may also include a transceiver 246 coupled to processor 242 and capable of wirelessly transmitting and receiving data. In some implementations, apparatus 240 may further include a memory 244 coupled to processor 242 and capable of being accessed by processor 242 and storing data therein. Accordingly, apparatus 210, apparatus 220, apparatus 230 and apparatus 240 may wirelessly communicate with each other via transceiver 216, transceiver 226, transceiver 236 and transceiver 246, respectively.

For illustrative purposes and without limiting the scope of the present disclosure, a number of communication links established among apparatus 210, apparatus 220, apparatus 230 and apparatus 240 are shown in FIG. 2 such as, for example, communication link 1, communication link 2, communication link 3, communication link 4 and communication link 5 (denoted as "link 1", "link 2", "link 3", "link 4" and "link 5" in FIG. 2, respectively). For instance, as an illustrative example, communication link 1 may be established between apparatus 210 and apparatus 220, communication link 2 and communication link 3 may be established between apparatus 220 and apparatus 230, communication link 4 may be established between apparatus 210 and apparatus 240, and communication link 5 may be established between apparatus 230 and apparatus 240. At least one of communication link 1, communication link 2, communication link 3, communication link 4 and communication link 5 may be a bidirectional link that includes a downlink and an uplink. At least one of communication link 1, communication link 2, communication link 3, communication link 4 and communication link 5 may be a unidirectional link that includes a downlink or an uplink.

To aid better understanding, the following description of the operations, functionalities and capabilities of each of apparatus 210, apparatus 220, apparatus 230 and apparatus 240 is provided in the context of a mobile communication environment in which apparatus 220 is implemented in or as a second wireless communication device, a communication apparatus or a UE and apparatus 210 is implemented in or as a first wireless communication device or a network node (e.g., base station) of a communication network.

With respect to transmission of emulated probing signal in accordance with the present disclosure, processor 222 of apparatus 220 may receive a probing signal from apparatus 210. Additionally, processor 222 may perform measurement of the probing signal. Moreover, processor 222 may generate a power-controlled clear-to-send (CTS) signal with respect to the measurement. Furthermore, processor 222 may transmit, via transceiver 226, the power-controlled CTS signal to apparatus 210.

In some implementations, the probing signal may include a beamformed channel state information reference signal (CSI-RS).

In some implementations, the probing signal may function as a pre-scheduling reference signal and facilitate the measurement by the processor.

In some implementations, a beam generated based on a beamforming weight may be used for the probing signal. Moreover, the beamforming weight may represent transmission processing by apparatus 210 due to digital beamforming, analog beamforming, or both the digital beamforming and the analog beamforming.

In some implementations, in performing the measurement, processor 222 may estimate a product of a channel response of a communication channel between apparatus 210 and apparatus 220 and the beamforming weight at apparatus 220 due to digital beamforming, analog beamforming, or both the digital beamforming and the analog beamforming.

In some implementations, processor 222 may perform an emulation of reception of the probing signal by measuring a non-precoded channel state information reference signal (CSI-RS) from apparatus 210. Moreover, a hypothetical beamforming weight is applied to the measured non-precoded CSI-RS at apparatus 210.

In some implementations, the probing signal may include a CSI-RS with analog beamforming and without digital beamforming. Additionally, in performing the measurement, processor 222 may estimate a product of a channel response of a communication channel between apparatus 210 and apparatus 220 and a beamforming weight for the analog beamforming.

In some implementations, processor 222 may perform an emulated transmission of the probing signal to apparatus 220 based on a result of the estimating. Moreover, in performing the emulated transmission of the probing signal, processor 222 may perform an emulation for a beamforming weight for the digital beamforming.

In some implementations, processor 222 may receive, via transceiver 226, data from apparatus 210 responsive to transmitting the power-controlled CTS signal. Moreover, a first rank indicator (RI) and a first precoding matrix indicator (PMI) used by apparatus 210 in transmitting the data to apparatus 220 may be same as a second RI and a second PMI indicated in a feedback (e.g., CSI feedback) derived from a CSI-RS by apparatus 220, respectively.

With respect to when beamforming may be used and how beam correspondence may be used to generate power-controlled CTS in accordance with the present disclosure, processor 232 of apparatus 230 may receive, via transceiver 236, a power-controlled clear-to-send (CTS) signal from apparatus 220 which is in wireless communication with apparatus 210. Additionally, processor 232 may compare a signal strength of the power-controlled CTS signal to a threshold. Moreover, processor 232 may adjust a transmission power based on a result of the comparing. Furthermore, processor 232 may transmit, via transceiver 236, data at the adjusted transmission power.

In some implementations, the signal strength of the power-controlled CTS signal may be proportional to an inverse of a product of a channel response of the communication channel and a beamforming weight used by apparatus 210 in transmitting data to apparatus 220. Alternatively, the signal strength of the power-controlled CTS signal may be proportional to an inverse of a product of a channel response of the communication channel, a beamforming weight used by apparatus 210 in transmitting data to apparatus 220, and a transmission power from apparatus 210.

In some implementations, the beamforming weight may represent transmission processing by apparatus 210 due to digital beamforming, analog beamforming, or both the digital beamforming and the analog beamforming.

In some implementations, in receiving the power-controlled CTS, processor 232 may receive the power-controlled CTS during a transmission gap of apparatus 210 or before apparatus 210 transmits data to apparatus 220.

In some implementations, in adjusting the transmission power based on the result of the comparing, processor 232 may perform a number of operations. For instance, processor 232 may determine a power level for transmission without causing interference to apparatus 220 with a level of the interference over a limit. Moreover, processor 232 may adjust the transmission power to the power level in transmitting data to apparatus 240. Furthermore, processor 232 may adjust a spectral efficiency including modulation and coding level to apparatus 240. In some implementations, the adjusted transmission power may be zero (e.g., set to zero from a non-zero value).

With respect to how multiple compatibility tests may be performed in accordance with the present disclosure, processor 222 of apparatus 220 may receive, via transceiver 226 and during a first time slot, a first power-controlled CTS signal associated with a first communication link from apparatus 210. Additionally, processor 222 may transmit, via transceiver 226 and during a second time slot, a second power-controlled CTS associated with a second communication link. Moreover, processor 222 may determine, based on the first power-controlled CTS, whether a transmission by apparatus 220 over the second communication link will cause interference on the first communication link with a level of the interference over a limit. Furthermore, processor 222 may adjust a transmission power based on a result of the determining. Additionally, processor 222 may transmit, via transceiver 226, data at the adjusted transmission power.

In some implementations, a signal strength of the first power-controlled CTS signal may be proportional to an inverse of a product of a channel response of the first communication link and a beamforming weight used by apparatus 210 in transmitting data over the first communication link. Alternatively, a signal strength of the first power-controlled CTS signal may be proportional to an inverse of a product of a channel response of the first communication link, a beamforming weight used by apparatus 210 in transmitting data over the first communication link, and a transmission power of apparatus 210. Moreover, a signal strength of the second power-controlled CTS signal may be proportional to an inverse of a product of a channel response of the second communication link and a beamforming weight used by apparatus 220 in transmitting data over the second communication link.

In some implementations, processor 222 may also receive, via transceiver 226 and during the first time slot, a third power-controlled CTS signal associated with a third communication link from apparatus 230. Additionally, processor 222 may determine, based on the third power-controlled CTS, whether the transmission by apparatus 220 over the second communication link will cause interference on the third communication link with the level of the interference over the limit. In some implementations, a signal strength of the third power-controlled CTS signal may be proportional to an inverse of a product of a channel response of the third communication link and a beamforming weight used by the third apparatus in transmitting data over the third communication link.

With respect to how D2D framework may be extended to cellular applications including conventional scenarios (e.g., downlink transmissions only and uplink transmissions only) as well as dynamic TDD scenarios (e.g., neighboring cells capable of performing downlink and uplink transmissions simultaneously) in accordance with the present disclosure, processor 222 of apparatus 220 may establish a wireless communication with apparatus 210 in a wireless network. Additionally, processor 222 may test each of a downlink and an uplink of the wireless communication between apparatus 210 and apparatus 220 for compatibility with one or more other communication links between two or more other wireless communication devices (e.g., apparatus 230 and/or apparatus 240) in the wireless network. Moreover, processor 222 may adjust a transmission power based on a result of the testing. Furthermore, processor 222 may transmit, via transceiver 226, data at the adjusted transmission power.

In some implementations, the wireless communication comprises a MU-MIMO communication or a dynamic TDD communication.

Illustrative Processes

Figure 3:
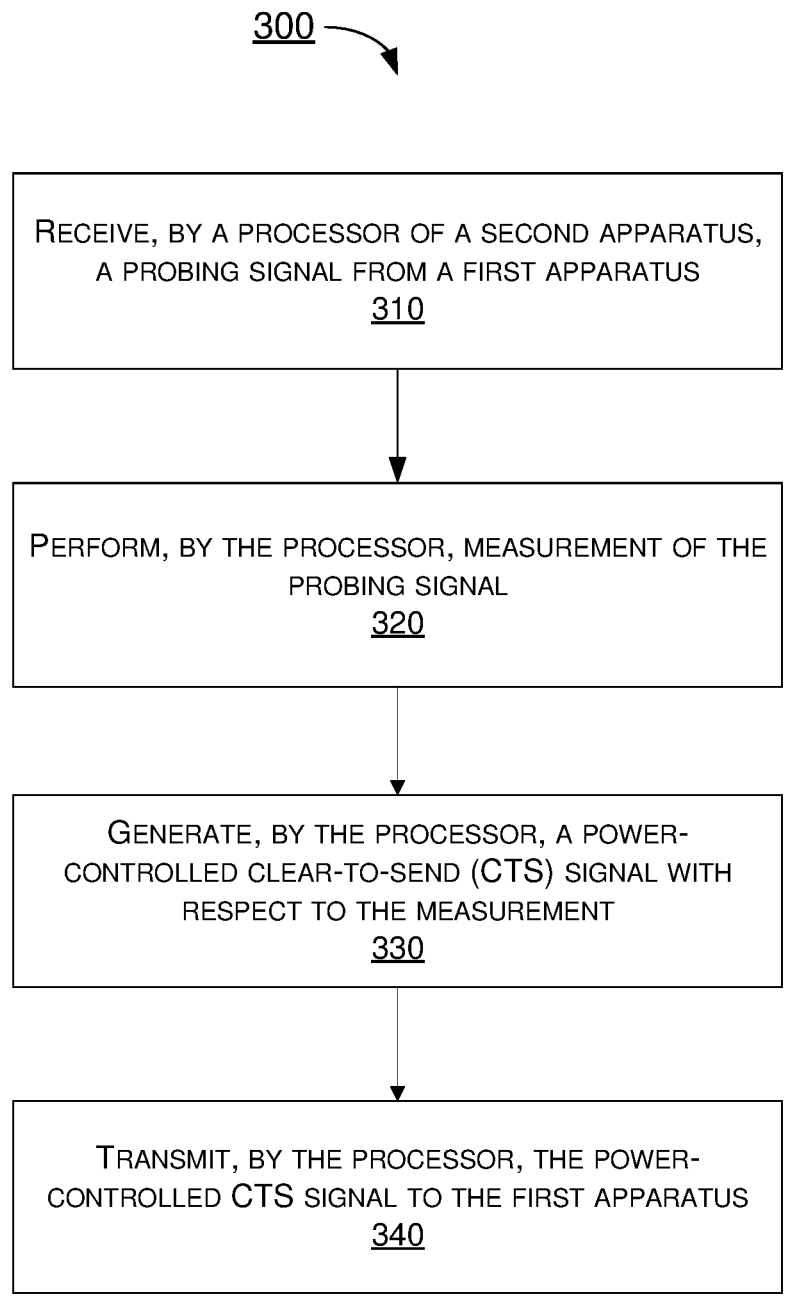
FIG. 3 is a flowchart of an example process in accordance with an implementation of the present disclosure.

FIG. 3 illustrates an example process 300 in accordance with an implementation of the present disclosure. Process 300 may be an example implementation of the proposed schemes described above with respect to transmission of emulated probing signal in accordance with the present disclosure. Process 300 may represent an aspect of implementation of features of apparatus 210, apparatus 220, apparatus 230 and apparatus 240. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may also be repeated partially or entirely. Process 300 may be implemented by apparatus 210, apparatus 220, apparatus 230, apparatus 240 and/or any suitable wireless communication device, UE, base station or machine type devices. Solely for illustrative purposes and without limitation, process 300 is described below in the context of apparatus 220. Process 300 may begin at block 310.

At 310, process 300 may involve processor 222 of apparatus 220 receiving a probing signal from apparatus 210. Process 300 may proceed from 310 to 320.

At 320, process 300 may involve processor 222 performing measurement of the probing signal. Process 300 may proceed from 320 to 330.

At 330, process 300 may involve processor 222 generating a power-controlled clear-to-send (CTS) signal with respect to the measurement. Process 300 may proceed from 330 to 340.

At 340, process 300 may involve processor 222 transmitting, via transceiver 226, the power-controlled CTS signal to apparatus 210.

In some implementations, the probing signal may include a beamformed channel state information reference signal (CSI-RS).

In some implementations, the probing signal may function as a pre-scheduling reference signal and facilitate the measurement by the processor.

In some implementations, a beam generated based on a beamforming weight may be used for the probing signal. Moreover, the beamforming weight may represent transmission processing by apparatus 210 due to digital beamforming, analog beamforming, or both the digital beamforming and the analog beamforming.

In some implementations, in performing the measurement, process 300 may involve processor 222 estimating a product of a channel response of a communication channel between apparatus 210 and apparatus 220 and the beamforming weight at apparatus 220 due to digital beamforming, analog beamforming, or both the digital beamforming and the analog beamforming.

In some implementations, process 300 may further involve processor 222 performing an emulation of reception of the probing signal by measuring a non-precoded channel state information reference signal (CSI-RS) from apparatus 210. Moreover, a hypothetical beamforming weight is applied to the measured non-precoded CSI-RS at apparatus 210.

In some implementations, the probing signal may include a CSI-RS with analog beamforming and without digital beamforming. Additionally, in performing the measurement, process 300 may involve processor 222 estimating a product of a channel response of a communication channel between apparatus 210 and apparatus 220 and a beamforming weight for the analog beamforming.

In some implementations, process 300 may further involve processor 222 performing an emulated transmission of the probing signal to apparatus 220 based on a result of the estimating. Moreover, in performing the emulated transmission of the probing signal, process 300 may involve processor 222 performing an emulation for a beamforming weight for the digital beamforming.

In some implementations, process 300 may further involve processor 222 receiving, via transceiver 226, data from apparatus 210 responsive to transmitting the power-controlled CTS signal. Moreover, a first rank indicator (RI) and a first precoding matrix indicator (PMI) used by apparatus 210 in transmitting the data to apparatus 220 may be same as a second RI and a second PMI indicated in a feedback (e.g., CSI feedback) derived from a CSI-RS by apparatus 220, respectively.

Figure 4:
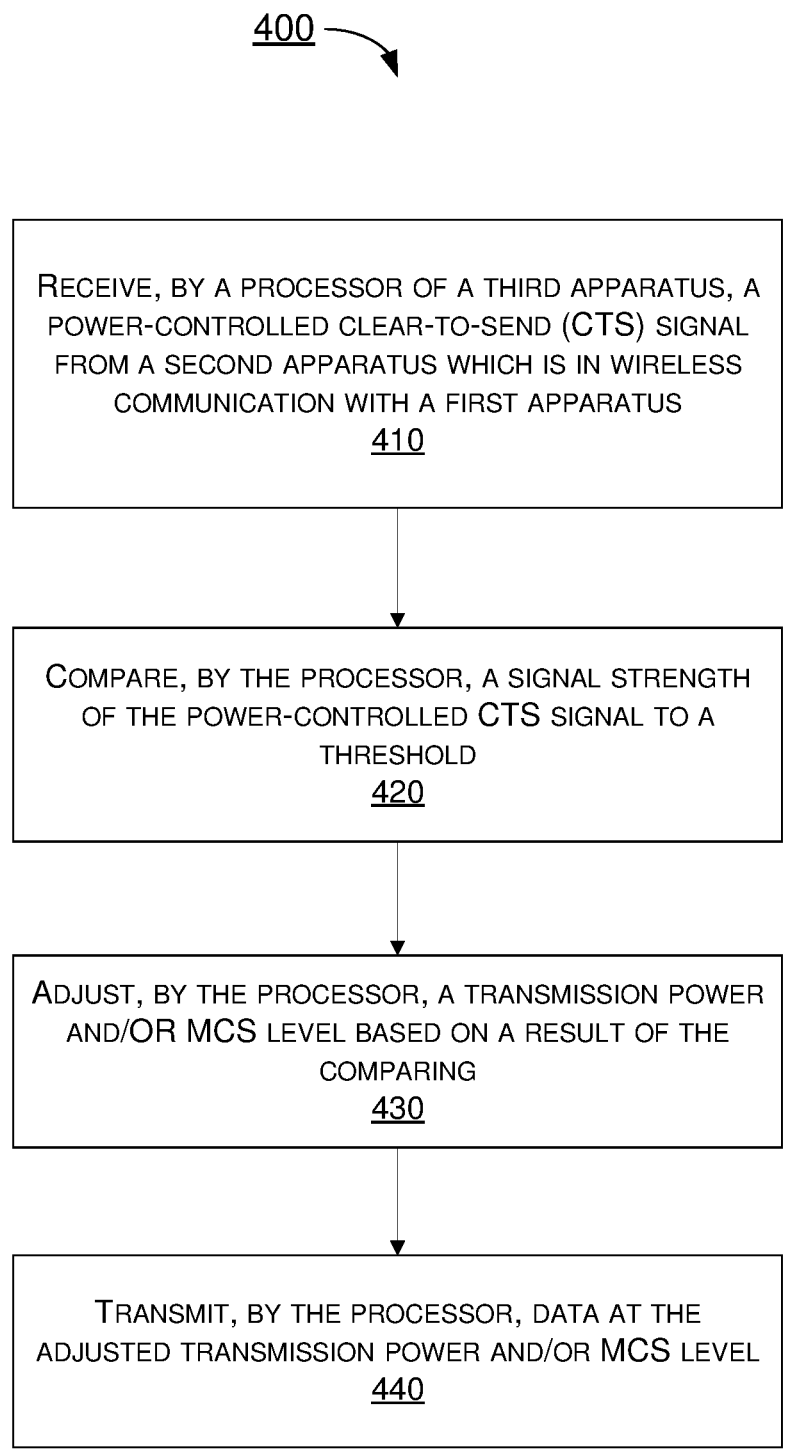
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to when beamforming may be used and how beam correspondence may be used to generate power-controlled CTS in accordance with the present disclosure. Process 400 may represent an aspect of implementation of features of apparatus 210, apparatus 220, apparatus 230 and apparatus 240. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may be executed in the order shown in FIG. 4 or, alternatively, in a different order. Process 400 may also be repeated partially or entirely. Process 400 may be implemented by apparatus 210, apparatus 220, apparatus 230, apparatus 240 and/or any suitable wireless communication device, UE, base station or machine type devices. Solely for illustrative purposes and without limitation, process 400 is described below in the context of apparatus 230. Process 400 may begin at block 410.

At 410, process 400 may involve processor 232 of apparatus 230 receiving, via transceiver 236, a power-controlled clear-to-send (CTS) signal from apparatus 220 which is in wireless communication with apparatus 210. Process 400 may proceed from 410 to 420.

At 420, process 400 may involve processor 232 comparing a signal strength of the power-controlled CTS signal to a threshold. Process 400 may proceed from 420 to 430.

At 430, process 400 may involve processor 232 adjusting a transmission power based on a result of the comparing. Process 400 may proceed from 430 to 440.

At 440, process 400 may involve processor 232 transmitting, via transceiver 236, data at the adjusted transmission power.

In some implementations, the signal strength of the power-controlled CTS signal may be proportional to an inverse of a product of a channel response of the communication channel and a beamforming weight used by apparatus 210 in transmitting data to apparatus 220. Alternatively, the signal strength of the power-controlled CTS signal may be proportional to an inverse of a product of a channel response of the communication channel, a beamforming weight used by apparatus 210 in transmitting data to apparatus 220, and a transmission power from apparatus 210.

In some implementations, the beamforming weight may represent transmission processing by apparatus 210 due to digital beamforming, analog beamforming, or both the digital beamforming and the analog beamforming.

In some implementations, in receiving the power-controlled CTS, process 400 may involve processor 232 receiving the power-controlled CTS during a transmission gap of apparatus 210 or before apparatus 210 transmits data to apparatus 220.

In some implementations, in adjusting the transmission power based on the result of the comparing, process 400 may involve processor 232 performing a number of operations. For instance, process 400 may involve processor 232 determining a power level for transmission without causing interference to apparatus 220 with a level of the interference over a limit. Moreover, process 400 may involve processor 232 adjusting the transmission power to the power level in transmitting data to apparatus 240. Furthermore, process 400 may involve processor 232 adjusting a spectral efficiency including modulation and coding level to apparatus 240. In some implementations, the adjusted transmission power may be zero (e.g., set to zero from a non-zero value).

Figure 5:
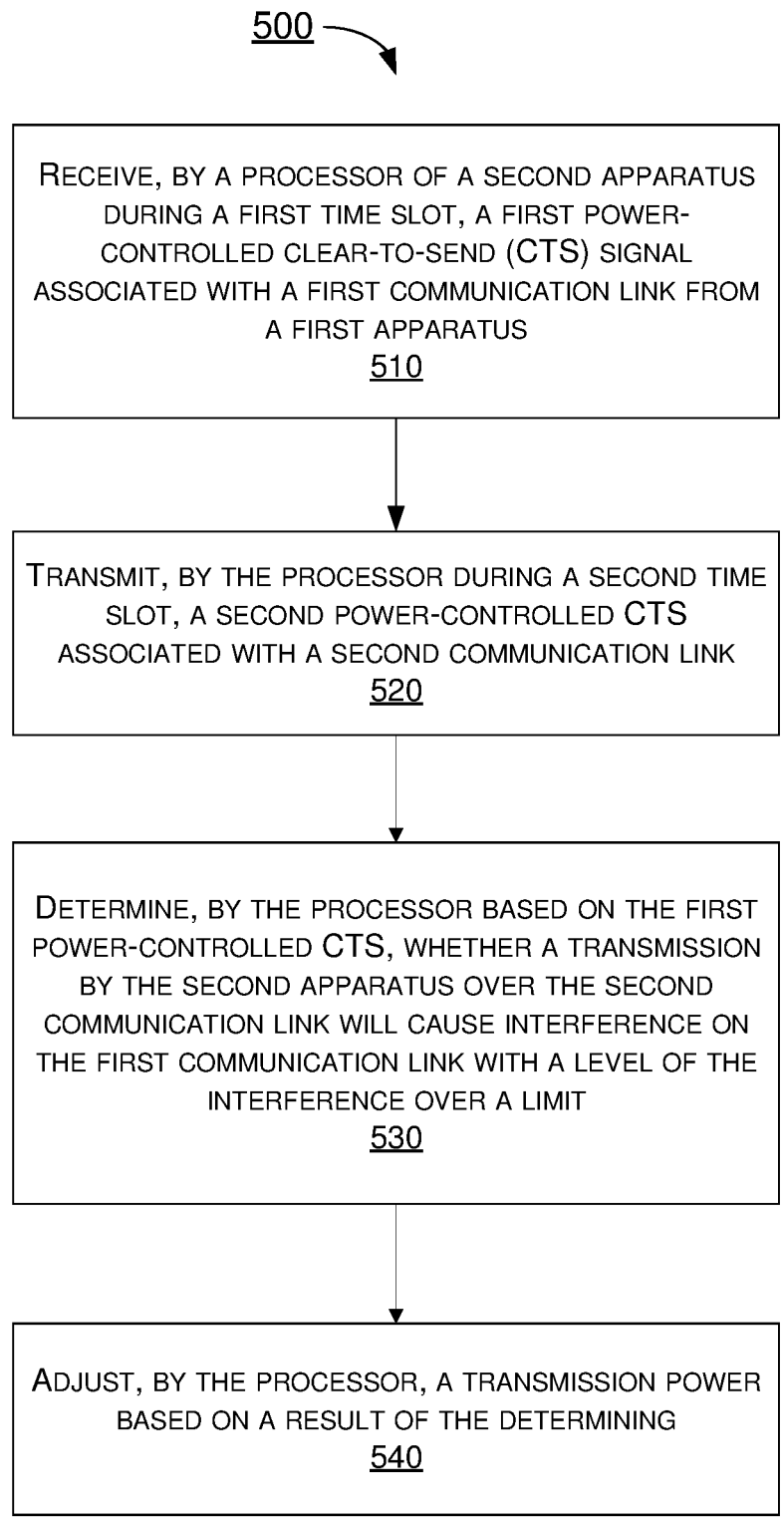
FIG. 5 is a flowchart of an example process in accordance with an implementation of the present disclosure.

FIG. 5 illustrates an example process 500 in accordance with an implementation of the present disclosure. Process 500 may be an example implementation of the proposed schemes described above with respect to how multiple compatibility tests may be performed in accordance with the present disclosure. Process 500 may represent an aspect of implementation of features of apparatus 210, apparatus 220, apparatus 230 and apparatus 240. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 210, apparatus 220, apparatus 230, apparatus 240 and/or any suitable wireless communication device, UE, base station or machine type devices. Solely for illustrative purposes and without limitation, process 500 is described below in the context of apparatus 220. Process 500 may begin at block 510.

At 510, process 500 may involve processor 222 of apparatus 220 receiving, via transceiver 226 and during a first time slot, a first power-controlled clear-to-send (CTS) signal associated with a first communication link from apparatus 210. Process 500 may proceed from 510 to 520.

At 520, process 500 may involve processor 222 transmitting, via transceiver 226 and during a second time slot, a second power-controlled CTS associated with a second communication link. Process 500 may proceed from 520 to 530.

At 530, process 500 may involve processor 222 determining, based on the first power-controlled CTS, whether a transmission by apparatus 220 over the second communication link will cause interference on the first communication link with a level of the interference over a limit. Process 500 may proceed from 530 to 540.

At 540, process 500 may involve processor 222 adjusting a transmission power based on a result of the determining.

In some implementations, a signal strength of the first power-controlled CTS signal may be proportional to an inverse of a product of a channel response of the first communication link and a beamforming weight used by apparatus 210 in transmitting data over the first communication link. Alternatively, a signal strength of the first power-controlled CTS signal may be proportional to an inverse of a product of a channel response of the first communication link, a beamforming weight used by apparatus 210 in transmitting data over the first communication link, and a transmission power of apparatus 210. Moreover, a signal strength of the second power-controlled CTS signal may be proportional to an inverse of a product of a channel response of the second communication link and a beamforming weight used by apparatus 220 in transmitting data over the second communication link.

In some implementations, process 500 may further involve processor 222 receiving, via transceiver 226 and during the first time slot, a third power-controlled CTS signal associated with a third communication link from apparatus 230. Additionally, process 500 may involve processor 222 determining, based on the third power-controlled CTS, whether the transmission by apparatus 220 over the second communication link will cause interference on the third communication link with the level of the interference over the limit. In some implementations, a signal strength of the third power-controlled CTS signal may be proportional to an inverse of a product of a channel response of the third communication link and a beamforming weight used by the third apparatus in transmitting data over the third communication link.

In some implementations, process 500 may further involve processor 222 transmitting, via transceiver 226, at the adjusted transmission power.

Figure 6:
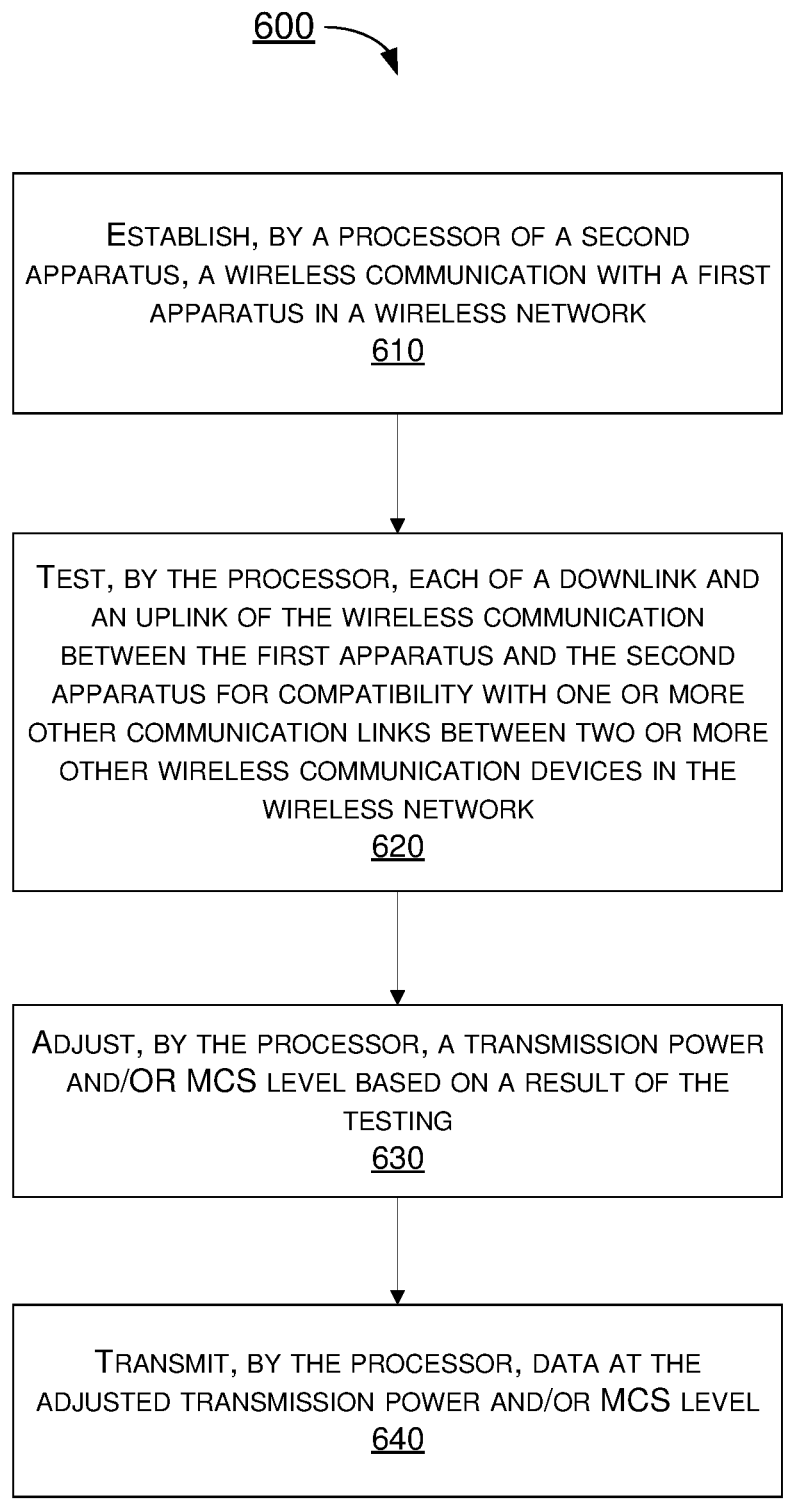
FIG. 6 is a flowchart of an example process in accordance with an implementation of the present disclosure.

FIG. 6 illustrates an example process 600 in accordance with an implementation of the present disclosure. Process 600 may be an example implementation of the proposed schemes described above with respect to how D2D framework may be extended to cellular applications including conventional scenarios (e.g., downlink transmissions only and uplink transmissions only) as well as dynamic TDD scenarios (e.g., neighboring cells capable of performing downlink and uplink transmissions simultaneously) in accordance with the present disclosure. Process 600 may represent an aspect of implementation of features of apparatus 210, apparatus 220, apparatus 230 and apparatus 240. Process 600 may include one or more operations, actions, or functions as illustrated by one or more of blocks 610, 620 and 630. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may also be repeated partially or entirely. Process 600 may be implemented by apparatus 210, apparatus 220, apparatus 230, apparatus 240 and/or any suitable wireless communication device, UE, base station or machine type devices. Solely for illustrative purposes and without limitation, process 600 is described below in the context of apparatus 220. Process 600 may begin at block 610.

At 610, process 600 may involve processor 222 of apparatus 220 establishing a wireless communication with apparatus 210 in a wireless network. Process 600 may proceed from 610 to 620.

At 620, process 600 may involve processor 222 testing each of a downlink and an uplink of the wireless communication between apparatus 210 and apparatus 220 for compatibility with one or more other communication links between two or more other wireless communication devices (e.g., apparatus 230 and/or apparatus 240) in the wireless network. Process 600 may proceed from 620 to 630.

At 630, process 600 may involve processor 222 adjusting a transmission power based on a result of the testing. Process 600 may proceed from 630 to 640.

At 640, process 600 may involve processor 222 transmitting, via transceiver 226, data at the adjusted transmission power.

In some implementations, the wireless communication comprises a MU-MIMO communication or a dynamic TDD communication.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of a second apparatus, a probing signal from a first apparatus;
performing, by the processor, measurement of the probing signal;
generating, by the processor, a power-controlled clear-to-send (CTS) signal with respect to the measurement; and
transmitting, by the processor, the power-controlled CTS signal to the first apparatus,
wherein a signal strength of the power-controlled CTS signal is proportional to an inverse of a product of a channel response, a beamforming weight used by the first apparatus in transmitting data to the second apparatus, and a transmission power from the first apparatus.

2. The method of claim 1, wherein the probing signal comprises a beamformed channel state information reference signal (CSI-RS).

3. The method of claim 1, wherein the probing signal functions as a pre-scheduling reference signal and facilitates the measurement by the processor.

4. The method of claim 1, wherein a beam generated based on a beamforming weight is used for the probing signal, and wherein the beamforming weight represents transmission processing by the first apparatus due to digital beamforming, analog beamforming, or both the digital beamforming and the analog beamforming.

5. The method of claim 4, wherein the performing of the measurement comprises estimating a product of a channel response of a communication channel between the first apparatus and the second apparatus and the beamforming weight at the second apparatus due to digital beamforming, analog beamforming, or both the digital beamforming and the analog beamforming.

6. The method of claim 1, further comprising:
performing, by the processor, an emulation of reception of the probing signal by measuring a non-precoded channel state information reference signal (CSI-RS) from the first apparatus,
wherein a hypothetical beamforming weight is applied to the measured non-precoded CSI-RS at the first apparatus.

7. The method of claim 1, wherein the probing signal comprises a channel state information reference signal (CSI-RS) with analog beamforming and without digital beamforming, and wherein the performing of the measurement comprises estimating a product of a channel response of a communication channel between the first apparatus and the second apparatus and a beamforming weight for the analog beamforming.

8. The method of claim 7, further comprising:
performing, by the processor, an emulated transmission of the probing signal to the second apparatus based on a result of the estimating,
wherein the performing comprises performing an emulation for a beamforming weight for the digital beamforming.

9. The method of claim 1, further comprising:
receiving, by the processor, data from the first apparatus responsive to transmitting the power-controlled CTS signal,
wherein a first rank indicator (RI) and a first precoding matrix indicator (PMI) used by the first apparatus in transmitting the data to the second apparatus are same as a second RI and a second PMI indicated in a feedback derived from a channel state information reference signal (CSI-RS) by the second apparatus, respectively.

10. A method, comprising:
receiving, by a processor of a third apparatus, a power-controlled clear-to-send (CTS) signal from a second apparatus which is in wireless communication with a first apparatus;
comparing, by the processor, a signal strength of the power-controlled CTS signal to a threshold; and
adjusting, by the processor, a transmission power based on a result of the comparing,
wherein the signal strength of the power-controlled CTS signal is proportional to an inverse of a product of a channel response of a communication channel, a beamforming weight used by the first apparatus in transmitting data to the second apparatus, and a transmission power from the first apparatus.

11. The method of claim 10, wherein the beamforming weight represents transmission processing by the first apparatus due to digital beamforming, analog beamforming, or both the digital beamforming and the analog beamforming.

12. The method of claim 10, wherein the receiving of the power-controlled CTS comprises receiving the power-controlled CTS during a transmission gap of the first apparatus or before the first apparatus transmits data to the second apparatus.

13. The method of claim 10, wherein the adjusting of the transmission power based on the result of the comparing comprises:
determining a power level for transmission without causing interference to the second apparatus with a level of the interference over a limit;
adjusting the transmission power to the power level in transmitting data to a fourth apparatus; and
adjusting a spectral efficiency including modulation and coding level to the fourth apparatus.

14. The method of claim 13, wherein the adjusted transmission power is zero.

15. A method, comprising:
receiving, by a processor of a second apparatus during a first time slot, a first power-controlled clear-to-send (CTS) signal associated with a first communication link from a first apparatus;
transmitting, by the processor during a second time slot, a second power-controlled CTS associated with a second communication link;
determining, by the processor based on the first power-controlled CTS, whether a transmission by the second apparatus over the second communication link will cause interference on the first communication link with a level of the interference over a limit; and
adjusting, by the processor, a transmission power based on a result of the determining,
wherein either:
a signal strength of the first power-controlled CTS signal is proportional to an inverse of a product of a channel response of the first communication link, a beamforming weight used by the first apparatus in transmitting data over the first communication link, and a transmission power of the first apparatus, or
a signal strength of the second power-controlled CTS signal is proportional to an inverse of a product of a channel response of the second communication link and a beamforming weight used by the second apparatus in transmitting data over the second communication link.

16. The method of claim 15, further comprising:
receiving, by the processor during the first time slot, a third power-controlled CTS signal associated with a third communication link from a third apparatus; and
determining, by the processor based on the third power-controlled CTS, whether the transmission by the second apparatus over the second communication link will cause interference on the third communication link with the level of the interference over the limit,
wherein a signal strength of the third power-controlled CTS signal is proportional to an inverse of a product of a channel response of the third communication link and a beamforming weight used by the third apparatus in transmitting data over the third communication link.

17. A method, comprising:
establishing, by a processor of a second apparatus, a wireless communication with a first apparatus in a wireless network;
testing, by the processor, each of a downlink and an uplink of the wireless communication between the first apparatus and the second apparatus for compatibility with one or more other communication links between two or more other wireless communication devices in the wireless network by using beamformed sounding reference signal (SRS) transmissions; and
adjusting, by the processor, a transmission power based on a result of the testing.

18. The method of claim 17, wherein the wireless communication comprises a multi-user multiple-input-and-multiple-output (MU-MIMO) communication or a dynamic time-division duplexing (TDD) communication.

* * * * *